US012118913B2

(12) United States Patent
Kim et al.

(10) Patent No.: US 12,118,913 B2
(45) Date of Patent: Oct. 15, 2024

(54) ELECTRONIC DEVICE AND DRIVING METHOD OF ELECTRONIC DEVICE

(71) Applicant: Samsung Display Co., Ltd., Yongin-si (KR)

(72) Inventors: Dowon Kim, Gwacheon-si (KR); Yoon Kang, Suwon-si (KR); Min-Weun Kim, Seoul (KR); Sung-Yeol Baek, Anyang-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/986,134

(22) Filed: Nov. 14, 2022

(65) Prior Publication Data

US 2023/0237949 A1 Jul. 27, 2023

(30) Foreign Application Priority Data

Feb. 17, 2022 (KR) ........................ 10-2022-0020826

(51) Int. Cl.
*G09G 3/20* (2006.01)
*G09G 3/3233* (2016.01)

(52) U.S. Cl.
CPC ......... *G09G 3/2007* (2013.01); *G09G 3/3233* (2013.01); *G09G 2320/0242* (2013.01); *G09G 2320/0276* (2013.01); *G09G 2320/041* (2013.01); *G09G 2360/16* (2013.01)

(58) Field of Classification Search
CPC ... G09G 2320/0242; G09G 2320/0276; G09G 2320/0285; G09G 2320/041; G09G 2320/0673; G09G 2360/16; G09G 3/2007; G09G 3/3225; G09G 3/3233
See application file for complete search history.

(56) References Cited

U.S. PATENT DOCUMENTS

| | | | |
|---|---|---|---|
| 2010/0277519 A1 | 11/2010 | Lee | |
| 2012/0249619 A1 | 10/2012 | Furukawa et al. | |
| 2013/0088506 A1 | 4/2013 | Yun et al. | |
| 2017/0213493 A1* | 7/2017 | Han | G09G 3/3208 |
| 2019/0103062 A1* | 4/2019 | Li | G01K 13/00 |
| 2021/0110752 A1 | 4/2021 | Kim et al. | |

FOREIGN PATENT DOCUMENTS

| | | |
|---|---|---|
| JP | 5449404 B2 | 3/2014 |
| KR | 1020070040999 A | 4/2007 |
| KR | 1020130037019 A | 4/2013 |
| KR | 1020200067389 A | 6/2020 |
| KR | 1020210043046 A | 4/2021 |

* cited by examiner

*Primary Examiner* — Kenneth Bukowski
(74) *Attorney, Agent, or Firm* — CANTOR COLBURN LLP

(57) ABSTRACT

An electronic device includes a display layer, a data driving circuit, a scan driving circuit, a driving controller, and a temperature sensor which measures a temperature of the display layer to generate temperature data. The driving controller includes a first lookup table calculating unit which calculates a first lookup table based on the image signal, the temperature data, and a reference lookup table set for each of a plurality of gray levels, a luminance compensating unit which calculates a luminance weight based on luminance data, and a second lookup table calculating unit which calculates a second lookup table based on the first lookup table and the luminance weight, and the driving controller generates the image data based on the image signal and the second lookup table.

20 Claims, 9 Drawing Sheets

FIG. 9

| | Low Gray Level Zone | | | | | | | | High Gray Level Zone | | |
|---|---|---|---|---|---|---|---|---|---|---|---|
| Gray Levels | Gray Level 0 | Gray Level 1 | ··· | Gray Level 7 | Gray Level 8 | Gray Level 9 | ··· | Gray Level 256 | Gray Level 257 | ··· | Gray Level 511 |
| First Lookup Table | LUT11 | LUT11 | ··· | LUT11 | LUT12 | LUT12 | ··· | LUT1(n-1) | LUT1n | ··· | LUT1n |

ELECTRONIC DEVICE AND DRIVING METHOD OF ELECTRONIC DEVICE

This application claims priority to Korean Patent Application No. 10-2022-0020826, filed on Feb. 17, 2022, and all the benefits accruing therefrom under 35 U.S.C. § 119, the content of which in its entirety is herein incorporated by reference.

BACKGROUND

1. Field

Embodiments of the disclosure described herein relate to an electronic device with improved display quality and a driving method of the electronic device.

2. Description of the Related Art

Recently, various display devices that are used in a multi-media device such as a television, a mobile phone, a tablet computer, a navigation system, and a game console have been developed.

As the display devices are used in various fields, a kind of a display layer for displaying an image in a display device is diversifying.

Nowadays, the display layer may include an emission-type display layer, and the emission-type display layer may include an organic light emitting display layer or a quantum dot light emitting layer.

SUMMARY

Embodiments of the disclosure provide an electronic device providing an improved display quality and a driving method of the electronic device.

According to an embodiment, an electronic device includes a display layer which displays an image, where the display layer includes a plurality of pixels connected with a plurality of data lines and a plurality of scan lines, a data driving circuit which drives the plurality of data lines, a scan driving circuit which drives the plurality of scan lines, a driving controller which generates image data based on a received image signal and controls the data driving circuit and the scan driving circuit, and a temperature sensor which measures a temperature of the display layer to generate temperature data. In such an embodiment, the driving controller includes a first lookup table calculating unit which calculates a first lookup table based on the image signal, the temperature data, and a reference lookup table set for each of a plurality of gray levels, a luminance compensating unit which calculates a luminance weight based on luminance data, and a second lookup table calculating unit which calculates a second lookup table based on the first lookup table and the luminance weight, and the driving controller generates the image data based on the image signal and the second lookup table.

In an embodiment, the plurality of gray levels may be classified into a low gray level zone defined by half of all the plurality of gray levels and a high gray level zone defined by the other half of all the plurality of gray levels, and the first lookup table calculating unit may calculate the first lookup table for each group of gray levels in the low gray level zone and may calculate the first lookup table for each gray level of the high gray level zone, based on a maximum gray level value of the high gray level zone.

In an embodiment, the plurality of gray levels may include 512 gray levels, the low gray level zone may include a 0-th gray level to a 256th gray level, the high gray level zone may include a 257th gray level to a 511st gray level, and each group of gray levels in the low gray level zone may include 8 gray levels.

In an embodiment, the first lookup table calculating unit may calculate the first lookup table with respect to all the plurality of gray levels.

In an embodiment, the luminance weight may be a different value for each gray level.

In an embodiment, the display layer may include a light emitting device including an organic light emitting material.

In an embodiment, the first lookup table may include a sign bit.

In an embodiment, the display layer may display the image based on the image data.

In an embodiment, the electronic device may further include a memory in which the reference lookup table is stored, and the driving controller may receive the reference lookup table from the memory.

According to an embodiment, an electronic device includes a display layer which includes a light emitting device that includes an organic light emitting material, a driving controller which generates image data based on a received image signal and to control the display layer, and a temperature sensor which measures a temperature of the light emitting device to generate temperature data. In such an embodiment, the driving controller includes a first lookup table calculating unit which calculates a first lookup table based on the image signal, the temperature data, and a reference lookup table set for each of gray levels, a luminance compensating unit which calculates a luminance weight based on luminance data, and a second lookup table calculating unit which calculates a second lookup table based on the first lookup table and the luminance weight. In such an embodiment, a plurality of gray levels is classified into a low gray level zone defined by some of the plurality of gray levels and a high gray level zone defined by the others of the plurality of gray levels. In such an embodiment, the first lookup table calculating unit calculates the first lookup table for each of the plurality of gray levels by calculating the first lookup table for each group of gray levels in the low gray level zone and calculates the first lookup table for each gray level of the high gray level zone based on a maximum gray level value of the high gray level zone, and the driving controller generates the image data based on the image signal and the second lookup table.

In an embodiment, the luminance weight may have a different value for each gray level.

In an embodiment, the first lookup table may be different from the second lookup table.

In an embodiment, the display layer may display an image based on the image data.

In an embodiment, the electronic device may further include a memory in which the reference lookup table is stored, and the driving controller may receive the reference lookup table from the memory.

According to an embodiment, a driving method of an electronic device includes generating temperature data, calculating a first lookup table for each of gray levels based on the temperature data and a reference lookup table set for each of a plurality of gray levels, calculating a luminance weight based on luminance data, calculating a second lookup table based on the first lookup table and the luminance weight, where the second lookup table is different from the first lookup table, and generating image data based on an image signal and the second lookup table.

In an embodiment, the driving method may further include displaying, at a display layer including a light emitting device of the electronic device, an image based on the image data.

In an embodiment, the generating the temperature data may include measuring a temperature of the light emitting device.

In an embodiment, the calculating the first lookup table may include classifying the plurality of gray levels into a low gray level zone defined by some of the plurality of gray levels and a high gray level zone defined by the others of the plurality of gray levels, calculating the first lookup table for each group of gray levels in the low gray level zone, and calculating the first lookup table for each gray level of the high gray level zone, based on a maximum gray level value of the high gray level zone.

In an embodiment, each group of gray levels in the low gray level zone may include 8 gray levels, the plurality of gray levels may include 512 gray levels, the low gray level zone may include a 0-th gray level to a 256th gray level, and the high gray level zone may include a 257th gray level to a 511st gray level.

In an embodiment, the calculating the luminance weight may include calculating the luminance weight to have a different value for each gray level.

BRIEF DESCRIPTION OF THE DRAWINGS

The above and other features of the disclosure will become apparent by describing in detail embodiments thereof with reference to the accompanying drawings.

FIG. 9 is a diagram illustrating first lookup tables corresponding to gray level groups, according to an embodiment of the disclosure.

DETAILED DESCRIPTION

Figure 1:
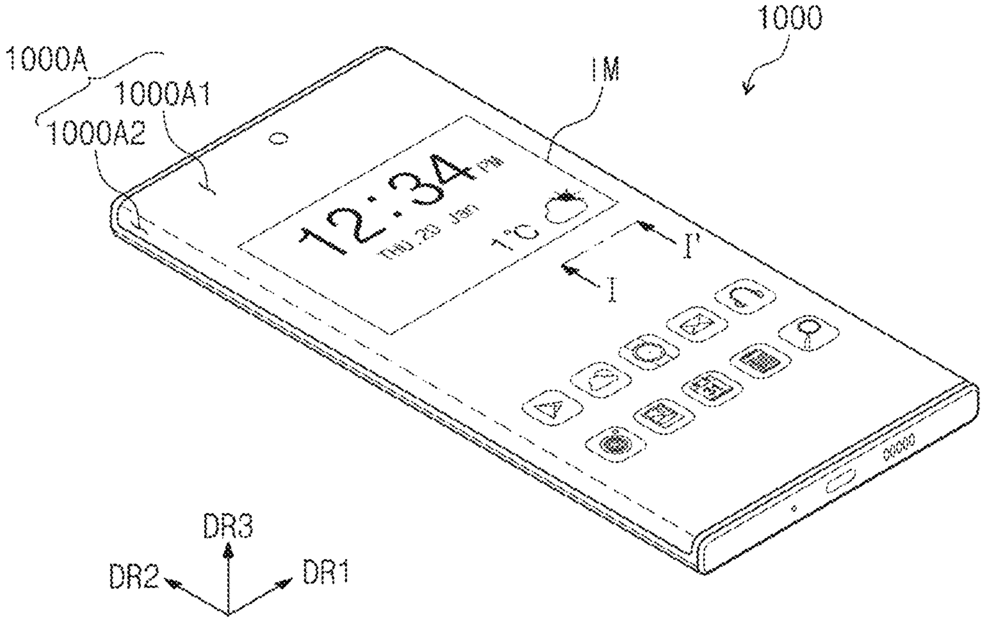
FIG. 1 is a perspective view of an electronic device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, the expression that a first component (or area, layer, part, portion, etc.) is "on", "connected with", or "coupled to" a second component means that the first component is directly on, connected with, or coupled to the second component or means that a third component is disposed therebetween.

Like reference numerals refer to like components. In addition, in drawings, thicknesses, proportions, and dimensions of components may be exaggerated to describe the technical features effectively. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the invention, a first component may be referred to as a "second component", and similarly, the second component may be referred to as the "first component".

Also, the terms "under", "below", "on", "above", etc. are used to describe the correlation of components illustrated in drawings. The terms that are relative in concept are described based on a direction shown in drawings.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the disclosure will be described in detail with reference to the accompanying drawings.

FIG. 1 is a perspective view of an electronic device according to an embodiment of the disclosure.

Referring to FIG. 1, an embodiment of an electronic device 1000 may include a large-sized electronic device such as a television, a monitor, or an outer billboard. In such an embodiment, the electronic device 1000 may include small and medium-sized electronic devices such as a personal computer, a notebook computer, a personal digital terminal, an automotive navigation system, a game console, a smartphone, a tablet, and a camera. However, the disclosure is not limited thereto. In an embodiment, for example, the electronic device 1000 may include any other electronic devices unless departing from the scope and spirit of the invention. An embodiment in which the electronic device 1000 is a smartphone is illustrated in FIG. 1.

A first display surface 1000A1 and a second display surface 1000A2 may be defined in an active area 1000A. The first display surface 1000A1 may be parallel to a plane defined by a first direction DR1 and a second direction DR2 intersecting the first direction DR1, and the second display surface 1000A2 may extend from the first display surface 1000A1.

The electronic device 1000 may display an image IM in the active area 1000A so as to face a third direction DR3. The third direction DR3 may be referred to as a "thickness direction". The image IM may include a still image as well as a moving image. A clock window and icons are illustrated in FIG. 1 as an embodiment of the image IM. The active area 1000A where the image IM is displayed may correspond to a front surface of the electronic device 1000.

In such an embodiment, a front surface (or an upper/top surface) and a rear surface (or a lower/bottom surface) of each member may be defined with respect to a direction in which the image IM is displayed. The front surface and the rear surface may face away from each other in the third direction DR3, and the normal direction of each of the front surface and the rear surface may be parallel to the third direction DR3. In the specification, the expression "when viewed on a plane" may mean "when viewed from a plan view in the third direction DR3".

The second display surface 1000A2 may be bent and provided from one side of the first display surface 1000A1. Also, the second display surface 1000A2 may include a plurality of second display surfaces 1000A2. In an embodiment, the second display surfaces 1000A2 may be bent and provided from at least two sides of the first display surface 1000A1. One first display surface 1000A1, and second display surfaces 1000A2, the number of which is 1 or more and 4 or less, may be defined in the active area 1000A. However, the shape of the active area 1000A is not limited thereto. In an alternative embodiment, for example, only the first display surface 1000A1 may be defined in the active area 1000A.

Figure 2A:
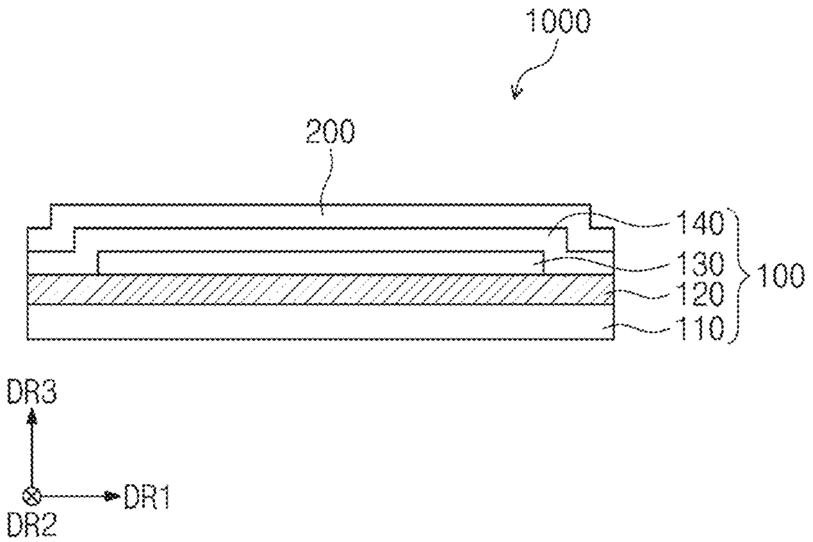
FIG. 2A is a cross-sectional view of an electronic device according to an embodiment of the disclosure.

FIG. 2A is a cross-sectional view of an electronic device according to an embodiment of the disclosure.

Referring to FIG. 2A, an embodiment of the electronic device 1000 may include a display layer 100 and a sensor layer 200.

The display layer 100 may be a component that substantially generates the image IM (refer to FIG. 1). The display layer 100 may be an emission-type display layer. In an embodiment, for example, the display layer 100 may be an organic light emitting display layer, a quantum dot display layer, a micro-LED display layer, or a nano-LED display layer. The display layer 100 may include a base layer 110, a circuit layer 120, a light emitting device layer 130, and an encapsulation layer 140.

The base layer 110 may be a member that provides a base surface on which the circuit layer 120 is disposed. The base layer 110 may be a glass substrate, a metal substrate, or a polymer substrate. However, an embodiment is not limited thereto. In an embodiment, for example, the base layer 110 may be an inorganic layer, an organic layer, or a composite material layer.

The base layer 110 may have a multi-layer structure. In an embodiment, for example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be collectively referred to as a "base barrier layer".

Each of the first and second synthetic resin layers may include a polyimide-based resin. Also, each of the first and second synthetic resin layers may include at least one selected from acrylate-based resin, methacrylate-based resin, polyisoprene-based resin, vinyl-based resin, epoxy-based resin, urethane-based resin, cellulose-based resin, siloxane-based resin, polyamide-based resin, and perylene-based resin. Here, the expression "~~-based resin" in the specification indicates that "~-based resin" includes the functional group of "~~".

The circuit layer 120 may be disposed on the base layer 110. The circuit layer 120 may include an insulating layer, a semiconductor pattern, a conductive pattern, a signal line, and the like. In an embodiment, an insulating layer, a semiconductor layer, and a conductive layer may be formed on the base layer 110 through a coating or deposition process, and the insulating layer, the semiconductor layer, and the conductive layer may be selectively patterned through a plurality of photolithography processes. Afterwards, the insulating layer, the semiconductor pattern, the conductive pattern, and the signal line included in the circuit layer 120 may be formed.

The light emitting device layer 130 may be disposed on the circuit layer 120. The light emitting device layer 130 may include a light emitting device. In an embodiment, for example, the light emitting device layer 130 may be an organic light emitting material, a quantum dot, a quantum rod, a micro light emitting diode (LED), or a nano LED.

The encapsulation layer 140 may be disposed on the light emitting device layer 130. The encapsulation layer 140 may protect the light emitting device layer 130 from foreign substances such as moisture, oxygen, and dust particles.

The sensor layer 200 may be disposed on the display layer 100. The sensor layer 200 may sense an external input applied from the outside.

In an embodiment, the sensor layer 200 may be formed on the display layer 100 through a successive process. In such an embodiment, the sensor layer 200 may be considered as being directly disposed on the display layer 100. Herein, the expression "directly disposed" may mean that a third component is not interposed between the sensor layer 200 and the display layer 100. That is, a separate adhesive member may not be interposed between the sensor layer 200 and the display layer 100. Alternatively, the sensor layer 200 may be coupled to the display layer 100 through an adhesive member. The adhesive member may include a typical adhesive or sticking agent.

Figure 2B:
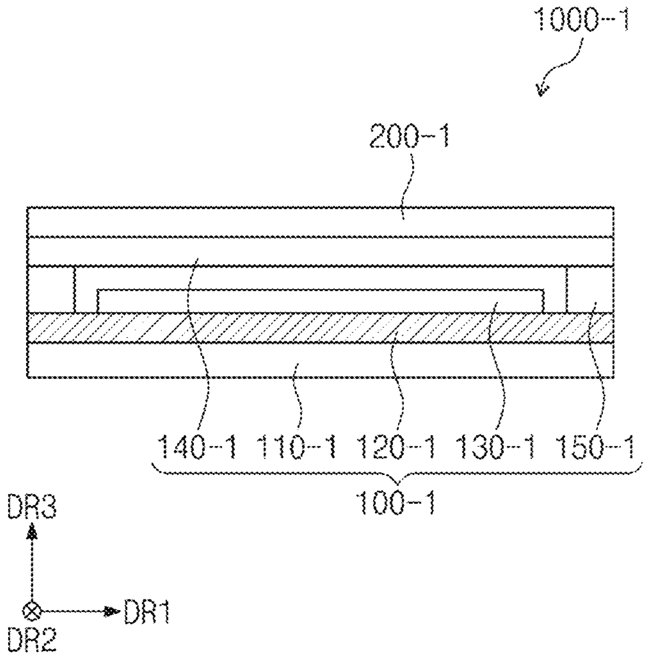
FIG. 2B is a cross-sectional view of an electronic device according to an embodiment of the disclosure.

FIG. 2B is a cross-sectional view of an electronic device according to an embodiment of the disclosure.

Referring to FIG. 2B, an embodiment of an electronic device 1000-1 may include a display layer 100-1 and a sensor layer 200-1.

The display layer 100-1 may include a base substrate 110-1, a circuit layer 120-1, a light emitting device layer 130-1, an encapsulation substrate 140-1, and a coupling member 150-1.

Each of the base substrate 110-1 and the encapsulation substrate 140-1 may be a glass substrate, a metal substrate, or a polymer substrate, but is not specifically limited thereto.

The coupling member 150-1 may be interposed between the base substrate 110-1 and the encapsulation substrate 140-1. The coupling member 150-1 may couple the encapsulation substrate 140-1 to the base substrate 110-1 or the circuit layer 120-1. The coupling member 150-1 may include an inorganic material or an organic material. In an embodiment, for example, the inorganic material may include a frit seal, and the organic material may include a photo-curable material or a photo-plastic resin. However, a material constituting the coupling member 150-1 is not limited to those described above.

The sensor layer 200-1 may be directly disposed on the encapsulation substrate 140-1 such that a third component is not interposed between the sensor layer 200-1 and the encapsulation substrate 140-1. That is, a separate adhesive member may not be interposed between the sensor layer 200-1 and the display layer 100-1. However, the disclosure is not limited thereto. In an embodiment, for example, an adhesive layer may be further interposed between the sensor layer 200-1 and the encapsulation substrate 140-1.

Figure 3:
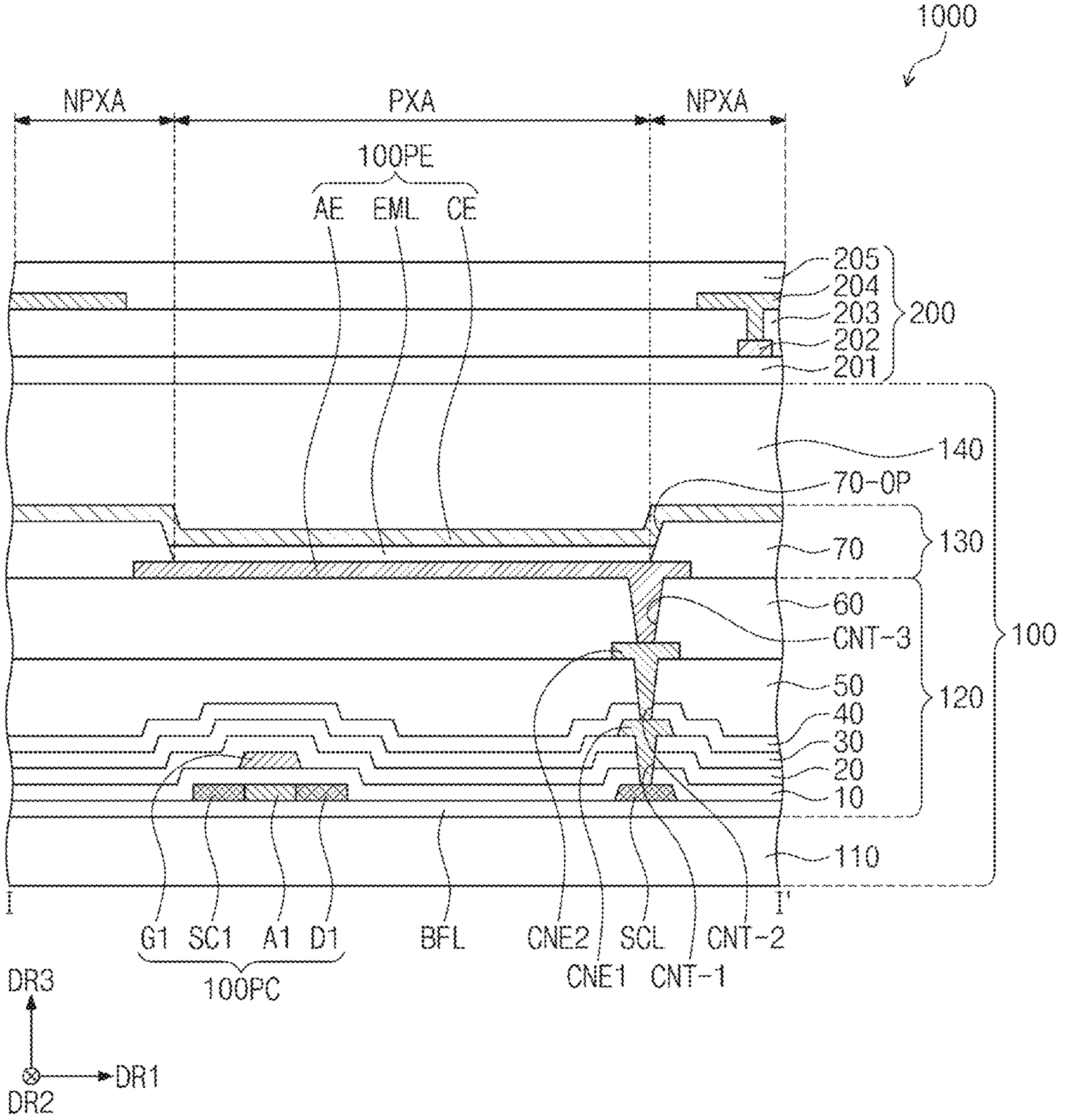
FIG. 3 is a cross-sectional view of an electronic device taken along line I-I' of FIG. 1, according to an embodiment of the disclosure.

FIG. 3 is a cross-sectional view of an electronic device taken along line I-I' of FIG. 1, according to an embodiment of the disclosure. In the description of FIG. 3, the same or like components as those described above with reference to FIG. 2A are marked by the same or like reference numerals, and thus, any repetitive detailed description will be omitted or simplified to avoid redundancy.

Referring to FIG. 3, at least one inorganic layer may be disposed or formed on an upper surface of the base layer 110. The inorganic layer may include at least one selected from aluminum oxide, titanium oxide, silicon oxide, silicon oxynitride, zirconium oxide, and hafnium oxide. The inorganic layer may be defined by or formed of multiple layers. The multiple inorganic layers may constitute a barrier layer and/or a buffer layer. In an embodiment, as shown in FIG. 3, the display layer 100 may include a buffer layer BFL.

The buffer layer BFL may improve a bonding force between the base layer 110 and a semiconductor pattern. The buffer layer BFL may include a silicon oxide layer and a silicon nitride layer, and the silicon oxide layer and the silicon nitride layer may be alternately stacked one on another.

The semiconductor pattern may be disposed on the buffer layer BFL. The semiconductor pattern may include polysilicon. However, the disclosure is not limited thereto, and alternatively, the semiconductor pattern may include amorphous silicon, low-temperature polycrystalline silicon, or oxide semiconductor.

FIG. 3 only illustrates a portion of the semiconductor pattern, and the semiconductor pattern may be further disposed in another area. Semiconductor patterns may be arranged across pixels in a specific rule (e.g., arrangement or pattern). An electrical property of the semiconductor pattern may vary depending on whether it is doped or not. The semiconductor pattern may include a first area having higher conductivity and a second area having lower conductivity. The first area may be doped with an N-type dopant or a P-type dopant. A P-type transistor may include a doping area doped with the P-type dopant, and an N-type transistor may include a doping area doped with the N-type dopant. The second region may be an undoped region or may be doped at a low concentration compared to the first region.

The conductivity of the first region may be greater than that of the second region and may substantially serve as an electrode or a signal line. The second area may substantially correspond to an active (or channel) of a transistor. In such an embodiment, a part of the semiconductor pattern may be an active of a transistor, another part thereof may be a source or a drain of the transistor, and another part may be a connection electrode or a connection signal line.

In an embodiment, each of pixels may have an equivalent circuit including 7 transistors, one capacitor, and a light emitting device, but the equivalent circuit of the pixel may be modified in various forms. The pixels will be described later in greater detail. For convenience of illustration, only one transistor 100PC and one light emitting device 100PE that are included in one pixel are illustrated in FIG. 3.

The transistor 100PC may include a source SC1, an active A1, a drain D1, and a gate G1. The source SC1, the active A1, and the drain D1 may be formed from or defined by the semiconductor pattern. In a cross-sectional view, the source SC1 and the drain D1 may extend from the active A1 in opposite directions. A part of a connection signal line SCL formed from or defined by the semiconductor pattern is illustrated in FIG. 3. Although not illustrated separately, the connection signal line SCL may be electrically connected with the drain D1 of the transistor 100PC in a plan view.

A first insulating layer 10 may be disposed on the buffer layer BFL. The first insulating layer 10 may overlap a plurality of pixels in common and may cover the semiconductor pattern. The first insulating layer 10 may be an inorganic layer and/or an organic layer, and may have a single-layer or multi-layer structure. The first insulating layer 10 may include at least one selected from aluminum oxide, titanium oxide, silicon oxide, silicon nitride, silicon oxynitride, zirconium oxide, and hafnium oxide. In an embodiment, the first insulating layer 10 may be a single silicon oxide layer. In an embodiment, the first insulating layer 10 or an insulating layer of the circuit layer 120 to be described later may be an inorganic layer and/or an organic layer, and may have a single-layer or multi-layer structure. The inorganic layer may include at least one selected from the materials described above but is not limited thereto.

The gate G1 is disposed on the first insulating layer 10. The gate G1 may be a part of a metal pattern. The gate G1 overlaps the active A1. The gate G1 may function as a mask in the process of doping the semiconductor pattern.

An second insulating layer 20 may be disposed on the first insulating layer 10 and may cover the gate G1. The second insulating layer 20 may overlap the pixels in common. The second insulating layer 20 may be an inorganic layer and/or an organic layer, and may have a single-layer or multi-layer structure. The second insulating layer 20 may include at least one selected from silicon oxide, silicon nitride, and silicon oxynitride. In an embodiment, the second insulating layer 20 may have a multi-layer structure including a silicon oxide layer and a silicon nitride layer.

A third insulating layer 30 may be disposed on the second insulating layer 20. The third insulating layer 30 may have a single-layer or multi-layer structure. In an embodiment, for example, the third insulating layer 30 may have a multi-layer structure including a silicon oxide layer and a silicon nitride layer.

A first connection electrode CNE1 may be disposed on the third insulating layer 30. The first connection electrode CNE1 may be connected with the connection signal line SCL through a contact hole CNT-1 defined through the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected with the first connection electrode CNE1 through a contact hole CNT-2 defined through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting device layer 130 may be disposed on the circuit layer 120. The light emitting device layer 130 may include the light emitting device 100PE. In an embodiment, for example, the light emitting device layer 130 may be an organic light-emitting material, a quantum dot, a quantum rod, a micro LED, or a nano LED. Hereinafter, for convenience of description, an embodiment in which the light emitting device 100PE is an organic light emitting device will be described, but the light emitting device 100PE is not specifically limited thereto.

The light emitting device 100PE includes a first electrode AE, an emission layer EML, and a second electrode CE. The first electrode AE may be disposed on the sixth insulating layer 60. The first electrode AE may be connected with the second connection electrode CNE2 through a contact hole CNT-3 defined through the sixth insulating layer 60.

A pixel defining layer 70 may be disposed on the sixth insulating layer 60 and may cover a part of the first electrode AE. An opening 70-OP is defined in the pixel defining layer 70. The opening 70-OP of the pixel defining layer 70 exposes at least a part of the first electrode AE.

The active area 1000A (refer to FIG. 1) may include an emission area PXA and a non-emission area NPXA adjacent to the emission area PXA. The non-emission area NPXA may surround the emission area PXA. In an embodiment, the emission area PXA is defined to correspond to a partial area of the first electrode AE, which is exposed by the opening 70-OP.

The emission layer EML may be disposed on the first electrode AE. The emission layer EML may be disposed in an area defined by the opening 70-OP. In an embodiment, the emission layer EML may be independently disposed for each pixel. In such an embodiment where the emission layers EML are independently disposed for each pixel, each of the emission layers EML may emit a light of at least one of a blue color, a red color, and a green color. However, the disclosure is not limited thereto. In an alternative embodiment, for example, the emission layer EML may be provided to be connected in common with the pixels. In such an embodiment, the emission layer EML may provide a blue color or may provide a white color.

The second electrode CE may be disposed on the emission layer EML. The second electrode CE may be in the shape of integration and may be disposed in common at a plurality of pixels. The second electrode CE may be referred to as a "common electrode CE".

Although not illustrated, a hole control layer may be interposed between the first electrode AE and the emission layer EML. The hole control layer may be disposed in common in the emission area PXA and the non-emission area NPXA. The hole control layer may include a hole transport layer and may further include a hole injection layer. An electron control layer may be interposed between the emission layer EML and the second electrode CE. The electron control layer may include an electron transport layer and may further include an electron injection layer. The hole control layer and the electron control layer may be formed, in common, in a plurality of pixels by using an open mask.

The encapsulation layer 140 may be disposed on the light emitting device layer 130. The encapsulation layer 140 may include an inorganic layer, an organic layer and an inorganic layer, which are sequentially stacked one on another, but layers constituting the encapsulation layer 140 are not limited thereto.

The inorganic layers may protect the light emitting device layer 130 from moisture and oxygen, and the organic layer may protect the light emitting device layer 130 from a foreign material such as dust particles. The inorganic layers may include a silicon nitride layer, a silicon oxynitride layer, a silicon oxide layer, a titanium oxide layer, an aluminum oxide layer, or the like. The organic layer may include an acrylic-based organic layer but is not limited thereto.

In an embodiment, the sensor layer 200 may be formed on the display layer 100 through a sequential process. In such an embodiment, the sensor layer 200 may be considered as being directly disposed on the display layer 100. Here, "directly disposed" may mean that a third component is not interposed between the sensor layer 200 and the display layer 100. In such an embodiment, a separate adhesive member may not be interposed between the sensor layer 200 and the display layer 100. Alternatively, the sensor layer 200 may be coupled to the display layer 100 through an adhesive member. The adhesive member may include a typical adhesive or sticking agent.

The sensor layer 200 may include a base insulating layer 201, a first conductive layer 202, a sensing insulating layer 203, a second conductive layer 204, and a cover insulating layer 205.

The base insulating layer 201 may be an inorganic layer including at least one selected from silicon nitride, silicon oxynitride, and silicon oxide. Alternatively, the base insulating layer 201 may be an organic layer including an epoxy resin, an acrylic resin, or an imide-based resin. The base insulating layer 201 may have a single-layer structure or may be a multi-layer structure in which a plurality of layers are stacked along the third direction DR3.

Each of the first conductive layer 202 and the second conductive layer 204 may have a single-layer structure or may have a multi-layer structure in which a plurality of layers are stacked along the third direction DR3.

The conductive layer having the single-layer structure may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), or indium zinc tin oxide (IZTO). In addition, the transparent conductive layer may include conductive polymer such as PEDOT, metal nanowire, or graphene.

The conductive layer having the multi-layer structure may include metal layers. The metal layers may have, for example, a three-layer structure of titanium/aluminum/titanium. The conductive layer of the multi-layer structure may include at least one metal layer and at least one transparent conductive layer.

At least one selected from the sensing insulating layer 203 and the cover insulating layer 205 may include an inorganic layer. The inorganic layer may include at least one selected from aluminum oxide, titanium oxide, silicon oxide, silicon nitride, silicon oxynitride, zirconium oxide, and hafnium oxide.

At least one of the sensing insulating layer 203 and the cover insulating layer 205 may include an organic film. The organic film may include at least one selected from an acrylic-based resin, a methacrylic-based resin, a polyisoprene, a vinyl-based resin, an epoxy-based resin, a urethane-based resin, a cellulose-based resin, a siloxane-based resin, a polyimide-based resin, a polyamide-based resin, and a perylene-based resin.

Figure 4:
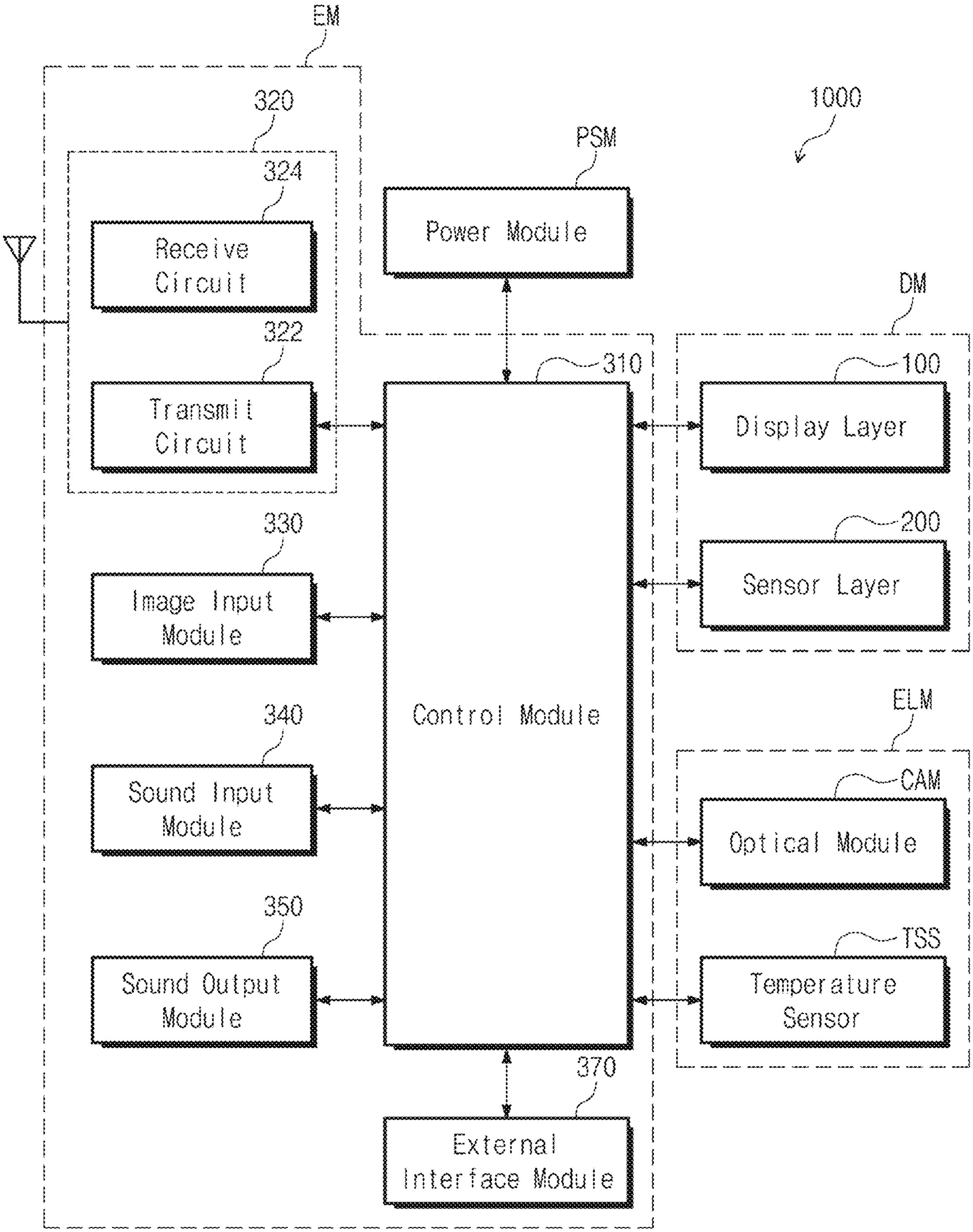
FIG. 4 is a block diagram of an electronic device according to an embodiment of the disclosure.

FIG. 4 is a block diagram of an electronic device according to an embodiment of the disclosure.

Referring to FIG. 4, an embodiment of the electronic device 1000 may include an electronic module EM, a power module PSM, a display module DM, and a sensing module ELM.

In an embodiment, the electronic module EM may include a control module 310, a wireless communication module 320, an image input module 330, a sound input module 340, a sound output module 350, and an external interface module 370. The modules of the electronic module EM described above may be mounted on a circuit board or may be electrically connected with through a flexible circuit board. The electronic module EM may be electrically connected with the power module PSM.

The control module 310 may control an overall operation of the electronic device 1000. In an embodiment, for example, the control module 310 may activate or deactivate the display module DM depending on a user input. The control module 310 may control the image input module 330, the sound input module 340, and the sound output module 350 depending on the user input. The control module 310 may include at least one microprocessor.

The wireless communication module 320 may transmit/receive a wireless signal to/from any other terminal by using a Bluetooth™ or Wi-Fi line. The wireless communication module 320 may transmit/receive a voice signal by using a general communication line. The wireless communication module 320 includes a transmit circuit 322 that modulates and transmits a signal to be transmitted, and a receive circuit 324 that demodulates a received signal.

The image input module 330 may process an image signal to be converted into image data capable of being displayed in the display module DM. In a record mode or a voice recognition mode, the sound input module 340 may receive an external sound signal through a microphone and may convert the received sound signal into electrical voice data. The sound output module 350 may convert sound data received from the wireless communication module 320 or sound data stored in a memory and may output conversion result to the outside.

The external interface module 370 may function as an interface for connection with an external charger, a wired/wireless data port, a card socket (e.g., a memory card, a SIM/UIM card socket), and the like.

In an embodiment, the power module PSM may supply a power used for the overall operation of the electronic device 1000. The power module PSM may include a general battery device.

In an embodiment, the display module DM may include the display layer 100 and the sensor layer 200.

In an embodiment, the sensing module ELM may include an optical module CAM and a temperature sensor TSS.

The optical module CAM may be an electronic part that outputs or receives an optical signal. The optical module CAM may transmit or receive an optical signal through a partial area of the display module DM.

The temperature sensor TSS may measure a temperature of the display layer 100. In an embodiment, for example, the temperature sensor TSS may measure a temperature of the light emitting device 100PE (refer to FIG. 3). In an embodiment of the disclosure, the temperature sensor TSS may measure the temperature of the display layer 100 at a given period or every predetermined time interval. Accordingly, the temperature sensor TSS may measure the temperature of the display layer 100, which changes depending on a change in an external environment of the electronic device 1000 (refer to FIG. 1) during an operation of the display layer 100, a kind of the image IM (refer to FIG. 1) displayed in the display layer 100, a time during which the image IM (refer to FIG. 1) is displayed, and the like.

A location where the temperature sensor TSS according to an embodiment of the disclosure is disposed is not limited thereto as long as a temperature of the display layer 100 is allowed to be measured. In an embodiment, for example, the temperature sensor TSS may be disposed under the display layer 100. However, the disclosure is not limited thereto. In an alternative embodiment, for example, the temperature sensor TSS may be disposed on/over the display layer 100. Alternatively, the temperature sensor TSS may be included in the display layer 100 or may be included in the sensor layer 200 for sensing an external input.

Figure 5:
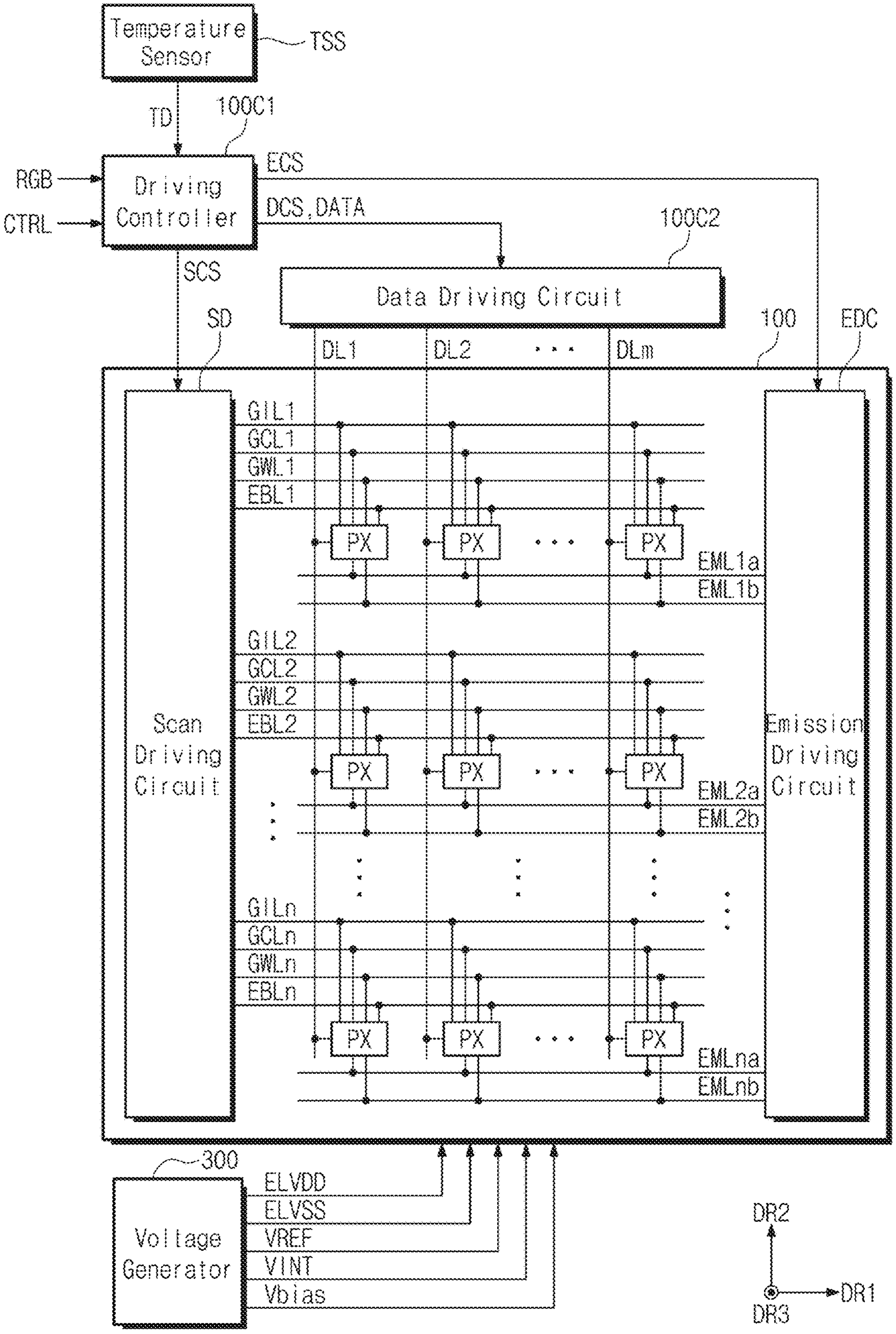
FIG. 5 is a block diagram of an electronic device according to an embodiment of the disclosure.

FIG. 5 is a block diagram of an electronic device according to an embodiment of the disclosure.

Referring to FIG. 5, in an embodiment, a driving controller 100C1 receives an image signal RGB and a control signal CTRL. The driving controller 100C1 may receive temperature data TD from the temperature sensor TSS. The driving controller 100C1 may generate image data DATA by converting a data format of the image signal RGB in compliance with the specification for an interface with a data driving circuit 100C2. The driving controller 100C1 may output a scan control signal SCS, a data control signal DCS, and an emission control signal ECS.

The data driving circuit 100C2 may receive the data control signal DCS and the image data DATA from the driving controller 100C1. The data driving circuit 100C2 may convert the image data DATA into data signals and may output the data signals to a plurality of data lines DL1 to DLm to be described later. The data signals may refer to analog voltages corresponding to a gray level value of the image data DATA.

A voltage generator 300 may generate voltages used for an operation of the display layer 100. In an embodiment of the disclosure, the voltage generator 300 may generate a first driving voltage ELVDD, a second driving voltage ELVSS, a reference voltage VREF, an initialization voltage VINT, and a bias voltage Vbias. However, the disclosure is not limited thereto. In an alternative embodiment, for example, the voltage generator 300 may not generate some of the above voltages or may further any other voltage(s) in addition to the above voltages.

The display layer 100 may include scan lines GIL1 to GILn, GCL1 to GCLn, GWL1 to GWLn, and EBL1 to EBLn, emission control lines EML1*a* to EMLna and EML1*b* to EMLnb, the data lines DL1 to DLm, and the pixels PX.

The display layer 100 may further include a scan driving circuit SD and an emission driving circuit EDC. In an embodiment of the disclosure, the scan driving circuit SD may be disposed on a first side of the display layer 100. The scan lines GIL1 to GILn, GCL1 to GCLn, GWL1 to GWLn, and EBL1 to EBLn may extend from the scan driving circuit SD in the first direction DR1.

The emission driving circuit EDC may be disposed on a second side of the display layer 100. In an embodiment, the second side may be opposite to the first side. The emission control lines EML1*a* to EMLna and EML1*b* to EMLnb may extend from the emission driving circuit EDC in a direction facing away from the first direction DR1.

The scan lines GIL1 to GILn, GCL1 to GCLn, GWL1 to GWLn, and EBL1 to EBLn and the emission control lines EML1*a* to EMLna and EMLIb to EMLnb are arranged to be spaced from each other in the second direction DR2. The data lines DL1 to DLm may extend from the data driving circuit 100C2 in a direction facing away from the second direction DR2 and may be arranged to be spaced from each other in the first direction DR1.

An embodiment in which the scan driving circuit SD and the emission driving circuit EDC are arranged to face each other with the pixels PX interposed therebetween is illustrated in FIG. 5, but the disclosure is not limited thereto. In an alternative embodiment, for example, the scan driving circuit SD and the emission driving circuit EDC may be disposed adjacent to each other on the first side or the second side of the display layer 100. In an embodiment, the scan driving circuit SD and the emission driving circuit EDC may be implemented with a single circuit.

The plurality of pixels PX may be electrically connected with the scan lines GIL1 to GILn, GCL1 to GCLn, GWL1 to GWLn, and EBL1 to EBLn, the emission control lines EML1*a* to EMLna and EML1*b* to EMLnb, and the data lines DL1 to DLm. Each of the plurality of pixels PX may be electrically connected with 4 scan lines and 2 emission control lines. In an embodiment, for example, as illustrated in FIG. 5, the pixels PX in a first row may be connected with the scan lines GIL1, GCL1, GWL1, and EBL1 and the emission control lines EML1*a* and EML1*b*. In such an embodiment, the pixels PX in a second row may be connected with the scan lines GIL2, GCL2, GWL2, and EBL2 and the emission control lines EML2*a* and EML2*b*.

Each of the plurality of pixels PX may receive the first driving voltage ELVDD, the second driving voltage ELVSS, the reference voltage VREF, the initialization voltage VINT, and the bias voltage Vbias from the voltage generator 300.

The scan driving circuit SD may receive the scan control signal SCS from the driving controller 100C1. The scan driving circuit SD may output scan signals to the scan lines GIL1 to GILn, GCL1 to GCLn, GWL1 to GWLn, and EBL1 to EBLn in response to the scan control signal SCS.

The emission driving circuit EDC may output emission control signals to the emission control lines EML1*a* to EMLna and EML1*b* to EMLnb in response to the emission control signal ECS from the driving controller 100C1.

Figure 6:
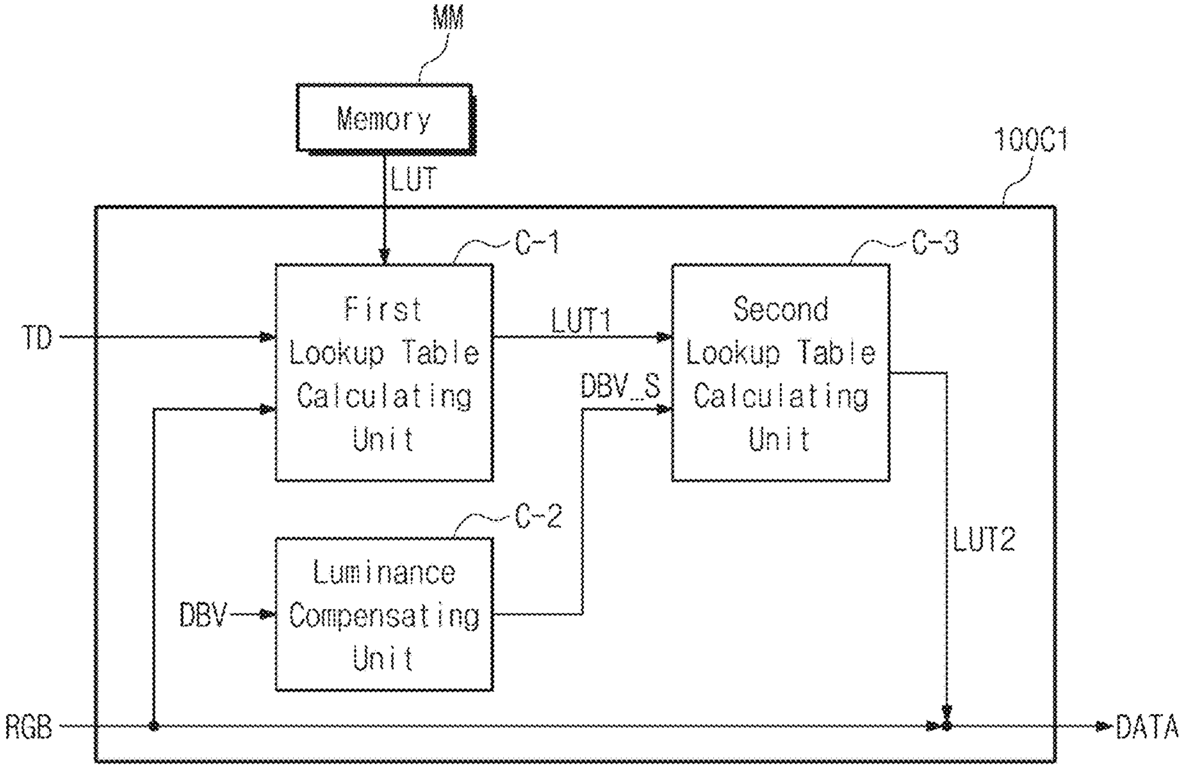
FIG. 6 is a block diagram illustrates a driving controller according to an embodiment of the disclosure.
Figure 7:
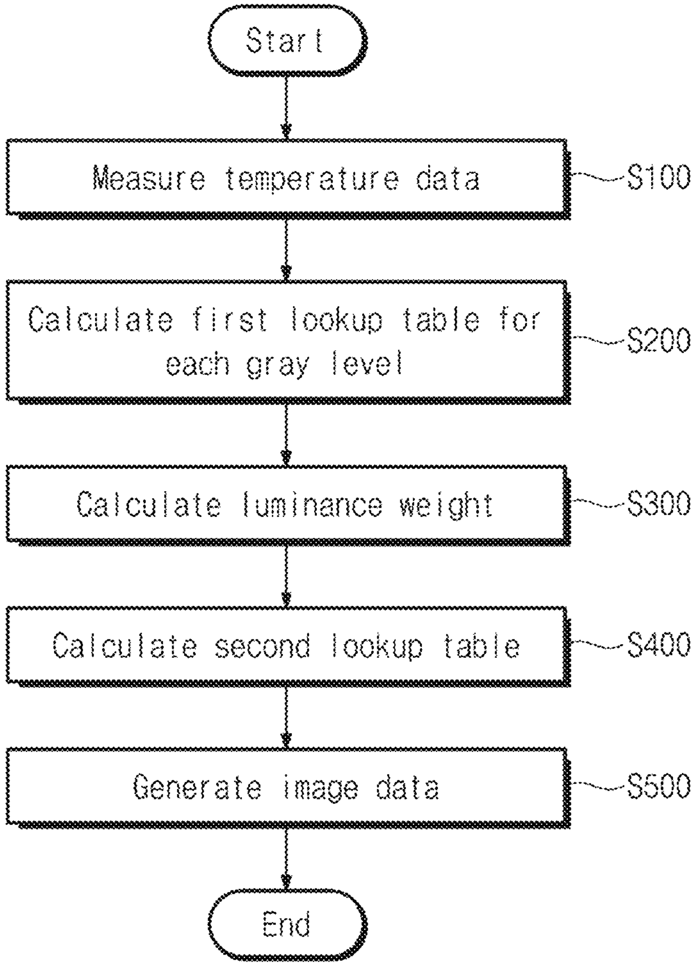
FIG. 7 is a flowchart illustrating a driving method of an electronic device according to an embodiment of the disclosure.

FIG. 6 is a block diagram illustrating a driving controller according to an embodiment of the disclosure, and FIG. 7 is a flowchart illustrating a driving method of an electronic device according to an embodiment of the disclosure.

Referring to FIGS. 5 to 7, an embodiment of the driving controller 100C 1 may include a first lookup table calculating unit C-1, a luminance compensating unit C-2, and a second lookup table calculating unit C-3.

The first lookup table calculating unit C-1 may receive the image signal RGB, the temperature data TD, and a reference lookup table LUT.

The temperature sensor TSS may measure the temperature data TD (S100). The temperature data TD may be received from the temperature sensor TSS and may include a temperature of the display layer 100.

The driving controller 100C1 may receive the reference lookup table LUT from a memory MM. The reference lookup table LUT that is determined in advance may be stored in the memory MM. The reference lookup table LUT may include a plurality of reference lookup tables that are set for respective gray levels. The reference lookup table LUT may refer to a lookup table for correcting a gamma value of the image signal RGB.

The reference lookup table LUT may include a first sign bit. The first sign bit may be an upper bit of the reference lookup table LUT. The first sign bit may refer to a sign of the reference lookup table LUT. The reference lookup table LUT may express a positive number or a negative number through the first sign bit.

The first lookup table calculating unit C-1 may calculate or generate a first lookup table LUT1 associated with all the plurality of gray levels (S200). The first lookup table LUT1 may be calculated based on the image signal RGB, the temperature data TD, and the reference lookup table LUT. The first lookup table LUT1 may refer to a lookup table for correcting a gamma value of the image signal RGB.

The first lookup table LUT1 may include a second sign bit. The second sign bit may be an upper bit of the first lookup table LUT1. The second sign bit may refer to a sign of the first lookup table LUT1. The first lookup table LUT1 may express a positive number or a negative number through the second sign bit.

According to an embodiment of the disclosure, even though a positive number or a negative number of the temperature data TD is expressed through the second sign bit, the first lookup table LUT1 may be calculated in a way such that a sign of the temperature data TD is applied thereto. In an embodiment, for example, a case where the temperature data TD is positive may refer to a high-temperature zone, and a case where the temperature data TD is negative may refer to a low-temperature zone. In such an embodiment, the first lookup table LUT1 may be calculated in a way such that the high-temperature zone in which a temperature measured by the temperature sensor TSS is 0° C. or higher, in addition to the low-temperature zone in which the measured temperature is lower than 0° C. are applied thereto. Accordingly, the electronic device 1000 (refer to FIG. 1) in which the reliability of temperature correction is improved may be provided.

The luminance compensating unit C-2 may calculate a luminance weight DBV_S based on luminance data DBV (S300). The luminance weight DBV_S may have a different value for each gray level.

The second lookup table calculating unit C-3 may calculate or generate a second lookup table LUT2 based on the first lookup table LUT1 and the luminance weight DBV_S (S400). The second lookup table LUT2 may be different from the first lookup table LUT1. The second lookup table LUT2 may be calculated by applying the luminance weight DBV_S to the first lookup table LUT1 in a multiplication manner. The second lookup table LUT2 may refer to a lookup table for correcting a gamma value of the image signal RGB.

The driving controller 100C1 may generate the image data DATA based on the image signal RGB and the second lookup table LUT2 (S500). The display layer 100 may display the image IM (refer to FIG. 1) based on the image data DATA.

According to an embodiment of the disclosure, the first lookup table calculating unit C-1 may receive the temperature data TD from the temperature sensor TSS in real time and may calculate the first lookup table LUT1 to which the correction for the temperature data TD is applied. The second lookup table calculating unit C-3 may calculate the second lookup table LUT2 based on the first lookup table LUT1 and the luminance weight DBV_S to which the correction for the luminance data DBV is applied. Accordingly, in such an embodiment, the degradation of a gamma light characteristic according to a temperature of the display layer 100 may be compensated for. The degradation of the gamma light characteristic may include a color coordinate distortion phenomenon. Accordingly, the electronic device 1000 (refer to FIG. 1) whose display quality is improved may be provided.

Figure 8A:
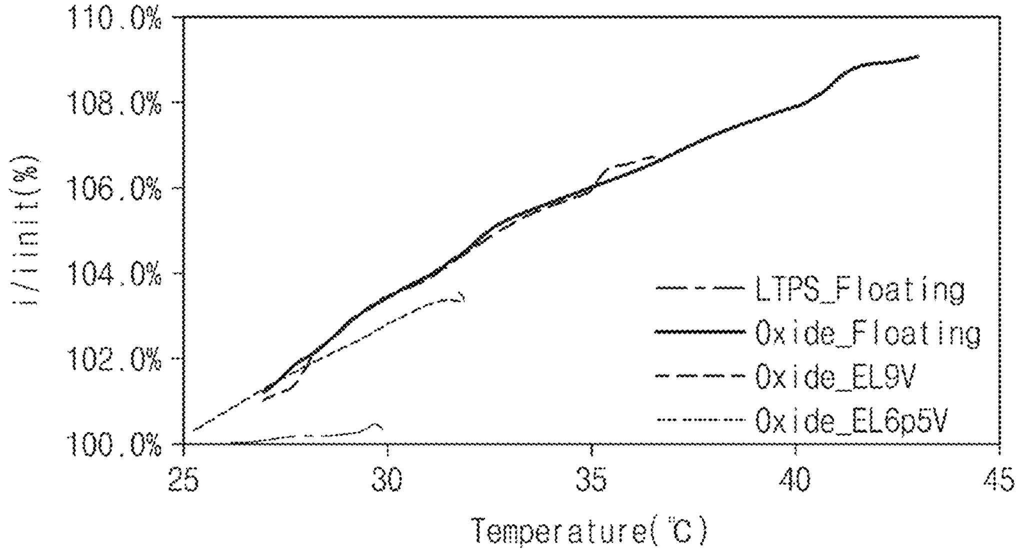
FIG. 8A is a graph illustrating a rate of change of a current to a temperature, according to an embodiment of the disclosure.
Figure 8B:
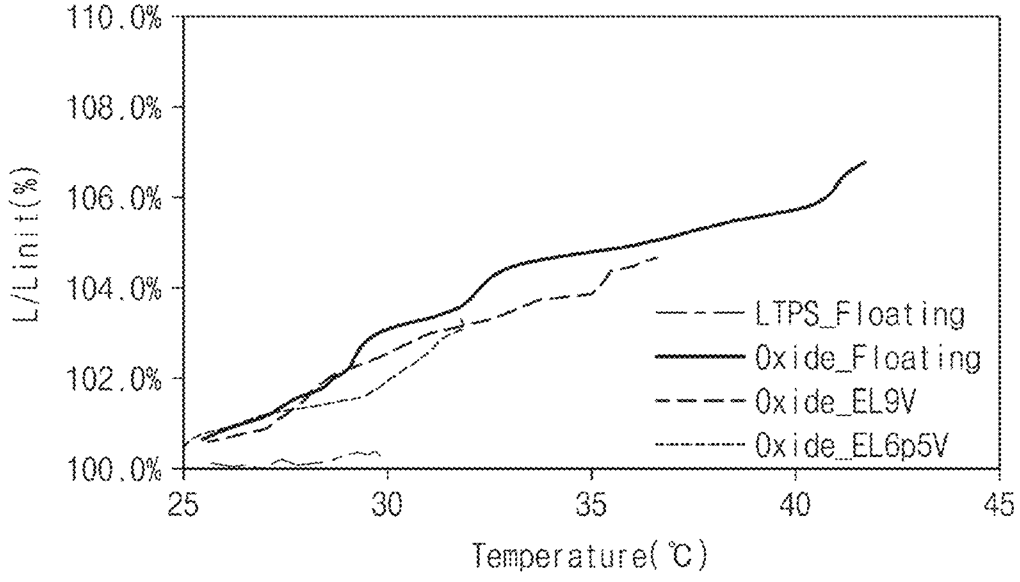
FIG. 8B is a graph illustrating a rate of change of luminance to a temperature, according to an embodiment of the disclosure

FIG. 8A is a graph illustrating a rate of change of a current to a temperature, according to an embodiment of the disclosure, and FIG. 8B is a graph illustrating a rate of change of luminance to a temperature, according to an embodiment of the disclosure.

Referring to FIGS. 7 to 8B, an embodiment of the display layer 100 may include the light emitting device 100PE (refer to FIG. 3) and the transistor 100PC (refer to FIG. 3). The light emitting device 100PE according to an embodiment of the disclosure may include an organic light emitting device. Graphs in FIGS. 8A and 8B show of rates of change of a current and luminance to a temperature of the display layer 100 including semiconductor patterns containing low-temperature polycrystalline silicon and oxide semiconductor under given conditions. That is, each of the graphs illustrated in FIGS. 8A and 8B shows the case of the display layer 100 including low-temperature polycrystalline silicon of a floating state (LTPS_Floating in FIGS. 8A and 8B), oxide semiconductor of a floating state (Oxide_Floating in FIGS. 8A and 8B), oxide semiconductor to which a given voltage is applied, and the like, as an example. Here, the given voltage may be 9 volts (V) (Oxide_EL9V in FIGS. 8A and 8B) or 5 V (Oxide_EL6p5V in FIGS. 8A and 8B).

In an embodiment of the display layer 100, a current may change depending on a temperature. FIG. 8A shows the rate of change of a current to a temperature at gray level 255, as an example. The first lookup table calculating unit C-1 may correct a change in a current to a temperature based on the temperature data TD. The first lookup table calculating unit C-1 may calculate the first lookup table LUT1 based on the temperature data TD and the reference lookup table LUT.

In an embodiment of the display layer 100, luminance may change depending on a temperature. FIG. 8B shows the rate of change of luminance to a temperature at gray level 255, as an example. The luminance compensating unit C-2 may receive the luminance data DBV from the outside. The luminance compensating unit C-2 may calculate the luminance weight DBV_S based on the luminance data DBV. The second lookup table calculating unit C-3 may calculate a change in luminance to a temperature, based on the first lookup table LUT1 and the luminance weight DBV_S. The second lookup table calculating unit C-3 may calculate the second lookup table LUT2 based on the first lookup table LUT1 corrected depending on a temperature and the luminance weight DBV_S.

In a case where the driving controller 100C1 does not perform temperature-based correction on the reference lookup table LUT, due to a characteristic of the organic light emitting device, a current and luminance may change depending on a temperature. In this case, a gamma light characteristic of the display layer 100 may be degraded. The degradation of the gamma light characteristic may include a color coordinate distortion phenomenon. That is, a display quality of an electronic device may be reduced. However, according to an embodiment of the disclosure, the second lookup table calculating unit C-3 may calculate the second lookup table LUT2 to which correction for a temperature and luminance is applied, based on the first lookup table LUT1 and the luminance weight DBV_S. In such an embodiment, correction for a temperature may be applied to the display layer 100 such that the gamma light characteristic according to a temperature of the display layer 100 may be compensated for. Accordingly, the electronic device 1000 (refer to FIG. 1) whose display quality is improved may be provided.

FIG. 9 is a diagram illustrating first lookup tables corresponding to gray level groups, according to an embodiment of the disclosure.

Referring to FIGS. 6 and 9, a gray scale range may include a low gray level zone and a high gray level zone. The low gray level zone may correspond to a portion of the gray scale range, and the high gray level zone may correspond to the remaining portion of the gray scale range. The low gray level zone may correspond to or be defined by half of the gray scale range, and the high gray level zone may correspond to or be defined by the other half of the gray scale range. However, this is only an example, and the way to divide the gray scale range into the low gray level zone and the high gray level zone is not limited thereto.

A 9-bit gray scale is illustrated in FIG. 9 as an example. In this case, the gray scale range may include 512 gray levels. However, this is only an example, and the gray scale according to an embodiment of the disclosure is not limited thereto. For example, in a case where an 8-bit gray scale is used, the gray scale range may include 256 gray levels.

In an embodiment, for example, where the 9-bit gray scale is used, the low gray level zone may include gray level 0 to gray level 256. In the low gray level zone, first lookup tables LUT11, LUT12, and LUT1(*n*−1) may be calculated for respective gray level groups, that is, each group of gray levels.

In this case, each of the gray level groups may include 8 gray levels. However, this is only an example, and the gray level group according to an embodiment of the disclosure is not limited thereto. For example, in the case where an 8-bit gray scale is used, the gray level group may include 4 gray levels. In an embodiment, for example, as shown in FIG. 9, the first lookup table LUT11 may be output with respect to gray level 0 to gray level 7. The first lookup table LUT12 may be output with respect to gray level 8 to gray level 15.

The high gray level zone may include gray level 257 to gray level 511. In the high gray level zone, the first lookup table LUT In may be calculated based on a maximum value of a gray level. In an embodiment, for example, as shown in FIG. 9, the first lookup table LUT1*n* may be output with respect to gray level 257 to gray level 511.

The first lookup table calculating unit C-1 may receive the temperature data TD from the temperature sensor TSS in real time and may calculate the first lookup table LUT1 to which the correction for the temperature data TD is applied. The first lookup table calculating unit C-1 may calculate the first lookup table LUT11, LUT12, LUT1(*n*−1), and LUT1*n* with respect to the whole gray scale range. The second lookup table calculating unit C-3 may calculate the second lookup table LUT2 to which the correction for a temperature and luminance is applied, based on the first lookup table LUT11, LUT12, LUT1(*n*−1), and LUT1*n* and the luminance weight DBV_S to which the correction for the luminance weight DBV_S is applied. In such an embodiment, correction for a temperature may be applied to the display layer 100 such that the degradation of a gamma light characteristic according to a temperature of the display layer 100 may be compensated for. In an embodiment, for example, the degradation of the gamma light characteristic may include a color coordinate distortion phenomenon.

According to an embodiment of the disclosure, the degradation of the gamma light characteristic due to a temperature may mainly occur at a low gray level. In the low gray level zone, the first lookup table calculating unit C-1 may calculate the first lookup table LUT1 for each of gray level groups: in the high gray level zone, the first lookup table calculating unit C-1 may calculate the first lookup table LUT1 based on a maximum value of a gray level. The second lookup table calculating unit C-3 may calculate the second lookup table LUT2 based on the first lookup table LUT1 and the luminance weight DBV_S. The degradation of the gamma light characteristic may mainly occur in the low gray level zone, and the driving controller 100C1 according to an embodiment of the disclosure may compensate for the degradation of the gamma light characteristic, with the low gray level zone focused on. That is, the accuracy of compensation of low gray levels may be improved. Accordingly, the electronic device 1000 (refer to FIG. 1) having an improved display quality may be provided.

Also, according to an embodiment of the disclosure, in the high gray level zone, the first lookup table calculating unit C-1 may calculate the first lookup table LUT1 based on a maximum value of a gray level, without calculating a lookup table for each gray level group such that the size of the first lookup table LUT1 may be decreased and the load of the driving controller 100C1 associated with a driving operation may also be reduced. In such an embodiment, it may be possible to quickly calculate the second lookup table LUT2 in real time. Accordingly, the electronic device 1000 (refer to FIG. 1) whose reliability is improved may be provided.

According to embodiments of the invention as described herein, a first lookup table calculating unit may receive temperature data from a temperature sensor in real time and may calculate a first lookup table to which correction for the temperature data is applied. In such embodiments, a second lookup table calculating unit may calculate a second lookup table to which the correction for temperature and luminance data is applied, based on the first lookup table and a luminance weight to which the correction for luminance data is applied such that the degradation of a gamma light characteristic according to a temperature of a display layer may be compensated for. The degradation of the gamma light characteristic may include a color coordinate distortion phenomenon. Accordingly, an electronic device whose display quality is improved may be provided.

Also, in such embodiments of the invention, the degradation of the gamma light characteristic due to a temperature may mainly occur at a low gray level. In a low gray level zone, the first lookup table calculating unit may calculate the first lookup table for each of gray level groups: in a high gray level zone, the first lookup table calculating unit may calculate the first lookup table based on a maximum value of a gray level. The second lookup table calculating unit may calculate a second lookup table based on the first lookup table and the luminance weight. The degradation of the gamma light characteristic may mainly occur in the low gray level zone, and the driving controller may compensate for the degradation of the gamma light characteristic, with the low gray level zone focused on. That is, the accuracy of compensation of low gray levels may be improved. Accordingly, an electronic device whose display quality is improved may be provided.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An electronic device comprising:

a display layer which displays an image, wherein the display layer includes a plurality of pixels connected with a plurality of data lines and a plurality of scan lines;

a data driving circuit which drives the plurality of data lines;

a scan driving circuit which drives the plurality of scan lines;

a driving controller which generates image data based on a received image signal and controls the data driving circuit and the scan driving circuit; and a temperature sensor which measures a temperature of the display layer to generate temperature data, wherein the driving controller includes:

a first lookup table calculating unit which calculates a first lookup table based on the image signal, the temperature data, and a reference lookup table set for each of a plurality of gray levels;

a luminance compensating unit which calculates a luminance weight based on luminance data; and a second lookup table calculating unit which calculates a second lookup table based on the first lookup table and the luminance weight, and wherein the driving controller generates the image data based on the image signal and the second lookup table.

2. The electronic device of claim 1, wherein the plurality of gray levels are classified into a low gray level zone defined by half of all the plurality of gray levels and a high gray level zone defined by the other half of all the plurality of gray levels, and wherein the first lookup table calculating unit calculates the first lookup table for each group of gray levels in the low gray level zone, and calculates the first lookup table for each gray level of the high gray level zone, based on a maximum gray level value of the high gray level zone.

3. The electronic device of claim 2, wherein the plurality of gray levels includes 512 gray levels, the low gray level zone includes a 0-th gray level to a 256th gray level, and the high gray level zone includes a 257th gray level to a 511st gray level, and wherein each group of gray levels in the low gray level zone includes 8 gray levels.

4. The electronic device of claim 1, wherein the first lookup table calculating unit calculates the first lookup table with respect to all the plurality of gray levels.

5. The electronic device of claim 1, wherein the luminance weight has a different value for each gray level.

6. The electronic device of claim 1, wherein the display layer includes a light emitting device including an organic light emitting material.

7. The electronic device of claim 1, wherein the first lookup table includes a sign bit.

8. The electronic device of claim 1, wherein the display layer displays the image based on the image data.

9. The electronic device of claim 1, further comprising:

a memory in which the reference lookup table is stored, wherein the driving controller receives the reference lookup table from the memory.

10. An electronic device comprising:

a display layer including a light emitting device including an organic light emitting material;

a driving controller which generates image data based on a received image signal and controls the display layer; and a temperature sensor which measures a temperature of the light emitting device to generate temperature data, wherein the driving controller includes:

a first lookup table calculating unit which calculates a first lookup table based on the image signal, the temperature data, and a reference lookup table set for each of gray levels;

a luminance compensating unit which calculates a luminance weight based on luminance data; and a second lookup table calculating unit which calculates a second lookup table based on the first lookup table and the luminance weight, wherein a plurality of gray levels are classified into a low gray level zone defined by some of the plurality of gray levels and a high gray level zone defined by the others of the plurality of gray levels, wherein the first lookup table calculating unit calculates the first lookup table for each of the plurality of gray levels by calculating the first lookup table for each group of gray levels in the low gray level zone and calculates the first lookup table for each gray level of the high gray level zone based on a maximum gray level value of the high gray level zone, and wherein the driving controller generates the image data based on the image signal and the second lookup table.

11. The electronic device of claim 10, wherein the luminance weight has a different value for each gray level.

12. The electronic device of claim 10, wherein the first lookup table is different from the second lookup table.

13. The electronic device of claim 10, wherein the display layer displays an image based on the image data.

14. The electronic device of claim 10, further comprising:

a memory in which the reference lookup table is stored, wherein the driving controller receives the reference lookup table from the memory.

15. A driving method of an electronic device, the driving method comprising:

generating temperature data;

calculating a first lookup table for each of gray levels based on the temperature data and a reference lookup table set for each of a plurality of gray levels;

calculating a luminance weight based on luminance data;

calculating a second lookup table based on the first lookup table and the luminance weight, wherein the second lookup table is different from the first lookup table; and generating image data based on an image signal and the second lookup table.

16. The driving method of claim 15, further comprising:

displaying, at a display layer including a light emitting device of the electronic device, an image based on the image data.

17. The driving method of claim 16, wherein the generating the temperature data includes:

measuring a temperature of the light emitting device.

18. The driving method of claim 15, wherein the calculating the first lookup table includes:

classifying the plurality of gray levels into a low gray level zone defined by some of the plurality of gray levels and a high gray level zone defined by the others of the plurality of gray levels;

calculating the first lookup table for each group of gray levels in the low gray level zone; and calculating the first lookup table for each gray level of the high gray level zone, based on a maximum gray level value of the high gray level zone.

19. The driving method of claim 18, wherein each group of gray levels in the low gray level zone includes 8 gray levels, and wherein the plurality of gray levels include 512 gray levels, the low gray level zone includes a 0-th gray level to a 256th gray level, and the high gray level zone includes a 257th gray level to a 511st gray level.

20. The driving method of claim 15, wherein the calculating the luminance weight includes:

calculating the luminance weight to have a different value for each gray level.

* * * * *